UNITED STATES PATENT OFFICE.

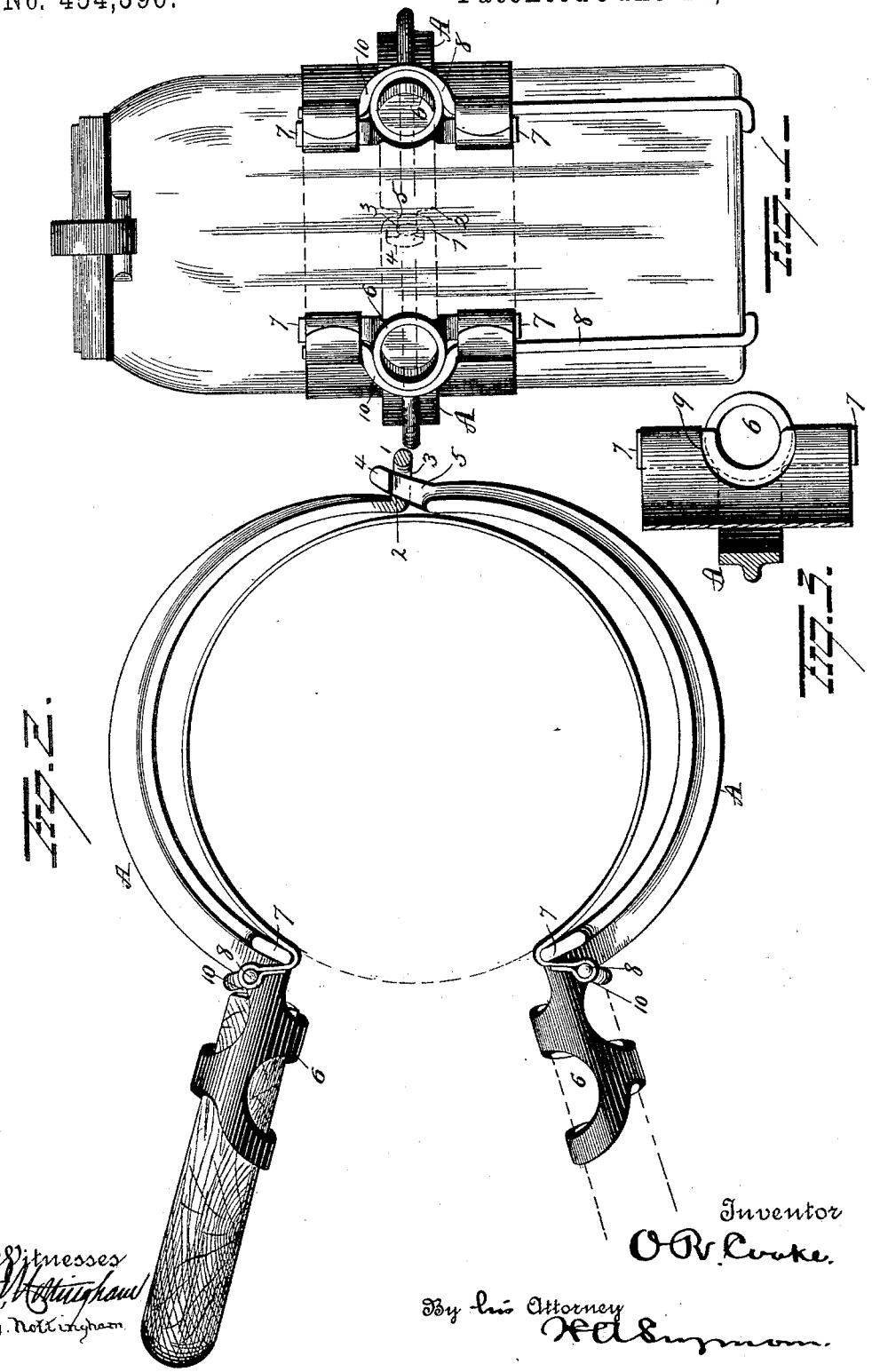

OSBORN R. COOKE, OF SALEM, OHIO.

FRUIT-JAR HOLDER.

SPECIFICATION forming part of Letters Patent No. 454,396, dated June 16, 1891.

Application filed April 26, 1890. Serial No. 349,639. (No model.)

*To all whom it may concern:*

Be it known that I, OSBORN R. COOKE, of Salem, in the county of Columbiana and State of Ohio, have invented certain new and useful Improvements in Fruit-Jar Holders; and I do hereby declare the following to be a full, clear, and exact description of the invention, such as will enable others skilled in the art to which it appertains to make and use the same.

My invention relates to an improvement in fruit-jar holders, the object being to provide a simple device for handling fruit-jars while they are being filled or their tops are being screwed on or off; and a further object is to provide a holder which can be easily manipulated and readjusted for different-sized jars.

With these ends in view my invention consists in certain novel features of construction and combinations of parts, as will be hereinafter described, and pointed out in the claims.

In the accompanying drawings, Figure 1 is a view in perspective of the jar-holder applied to a jar. Fig. 2 is a detached view, and Fig. 3 is a view of one of the handle-jaws.

A A represent a pair of handle-jaws. These are preferably made of cast iron, curved in about the shape of a jar with smooth inner surfaces and ribbed backs to give increased strength. Both jaws are alike, except at their adjacent ends 1 and 2, which, for convenience, are constructed, substantially as shown, to form a hinge. The end 1 is bent outwardly and has an elongated or elliptical slot 3 therein which extends longitudinally of the jaw, while the end 2 of the other jaw terminates in a double or T-shaped lug 4, which extends transversely across the slot 3 when the jaws are coupled together. Adjacent to this lug a restricted neck 5 is formed, which lies loosely in the slot.

The jaws are furnished at their opposite or free ends with handles or handle-sockets 6 6, as shown, adapted to receive the ends of wooden handles or other devices for operating the holder. Laterally-extending projections or lugs 7 7 are formed on the opposite sides of the handle-sockets or handles and a sheet-metal gripping-band is held at the ends by these projections or lugs. The band is bent outwardly at its ends around the lugs, and the extreme ends are folded over a wire or rod 8. The band has notches 9 9 cut out at its ends, and the wires or rods are bent or looped at points 10 opposite the notches around the handles. The wires or rods are bent in at their lower ends to help support the jar as the grip on it is relaxed.

For different-sized jars different-sized gripping-bands are provided, and the handles and jaws are removed from the bands by first twisting them laterally sufficiently to uncouple them and then their opposite ends are drawn through the notched openings formed by the bands and loops in the wires.

It is evident that slight changes might be resorted to in the form and arrangement of the several parts described without departing from the spirit and scope of my invention, and hence I do not wish to limit myself to the exact construction herein set forth.

Having fully described my invention, what I claim as new, and desire to secure by Letters Patent, is—

1. In a fruit-jar holder, the combination, with a pair of jaws hinged together and a gripping-band having openings at or near its ends, of wires held by the band, said wires closing the openings in order to form sockets for the jaws and extended at one end and bent at the extreme ends to receive the can and prevent it from slipping through the holder when the grip is released, substantially as set forth.

2. The combination, with a gripping-band having its ends bent outwardly and notches in said ends and a wire or rod folded in the ends and provided with a loop opposite the notches, of a pair of jaws detachably hinged at one end and provided with handles at the free ends and projections or lugs adapted to press against the outwardly-bent ends of the gripping-band, substantially as set forth.

In testimony whereof I have signed this specification in the presence of two subscribing witnesses.

OSBORN R. COOKE.

Witnesses:
WILLIS R. HALE,
E. O. FRENCH.